(12) United States Patent
Ricketts (10) Patent No.: US 7,881,961 B2
(45) Date of Patent: Feb. 1, 2011

(54) METHOD AND SYSTEM OF MANAGING A BUSINESS PROCESS

(75) Inventor: John A. Ricketts, Clarendon Hills, IL (US)

(73) Assignee: International Business Machines Corporation, Armonk, NY (US)

( * ) Notice: Subject to any disclaimer, the term of this patent is extended or adjusted under 35 U.S.C. 154(b) by 1700 days.

(21) Appl. No.: 11/055,403

(22) Filed: Feb. 10, 2005

(65) Prior Publication Data

US 2006/0178923 A1 Aug. 10, 2006

(51) Int. Cl.
G06F 11/34 (2006.01)
(52) U.S. Cl. ............. 705/11; 705/7; 705/8; 705/9; 705/10; 370/230; 370/241; 370/252; 700/100; 700/101; 700/102
(58) Field of Classification Search ............ 705/7–11; 370/230, 241, 252; 700/100–102
See application file for complete search history.

(56) References Cited

U.S. PATENT DOCUMENTS

| | | | | | |
|---|---|---|---|---|---|
| 5,093,794 | A | * | 3/1992 | Howie et al. | 700/100 |
| 5,390,243 | A | * | 2/1995 | Casselman et al. | 379/266.08 |
| 5,586,021 | A | * | 12/1996 | Fargher et al. | 700/100 |
| 5,684,964 | A | * | 11/1997 | Powers et al. | 705/11 |
| 5,799,173 | A | * | 8/1998 | Gossler et al. | 703/21 |
| 5,958,009 | A | * | 9/1999 | Friedrich et al. | 709/224 |
| 6,473,721 | B1 | * | 10/2002 | Chacon et al. | 702/182 |
| 6,501,473 | B1 | | 12/2002 | Hayes et al. | |
| 6,556,974 | B1 | * | 4/2003 | D'Alessandro | 705/10 |
| 6,678,250 | B1 | * | 1/2004 | Grabelsky et al. | 370/241 |
| 6,711,607 | B1 | * | 3/2004 | Goyal | 709/203 |
| 6,823,382 | B2 | * | 11/2004 | Stone | 709/224 |
| 6,885,641 | B1 | * | 4/2005 | Chan et al. | 370/252 |
| 6,901,536 | B2 | * | 5/2005 | Davenport | 714/39 |
| 6,963,542 | B2 | * | 11/2005 | Manthoulis et al. | 370/252 |
| 7,113,986 | B2 | * | 9/2006 | Goldszmidt et al. | 709/223 |
| 2002/0019873 | A1 | * | 2/2002 | Goldszmidt et al. | 709/228 |
| 2003/0125996 | A1 | | 7/2003 | Bush et al. | |

(Continued)

OTHER PUBLICATIONS

"Capacity Ulitization: Concept, Measurement and Recent Estimates"; Klein, Lawerence R.; Long, Virginia; Greenspan, Alan; Greenwald, Douglas; Edmonson, Nathan; Perry, George; Brookings Papers on Economic Activity, vol. 1973, No. 3 (1973), pp. 743-763.*

(Continued)

Primary Examiner—Romain Jeanty
Assistant Examiner—Alan Miller
(74) Attorney, Agent, or Firm—John R. Pivnichny; Law Office of Jim Boice (57) ABSTRACT

A method of managing capacity in a business process on demand for providing a service to a service requester. The method comprises the steps of providing a business process having one or more service inputs, at least one service output, at least one capacity constraint having a capacity level and a queue located ahead of the capacity constraint having an upper queue threshold and a lower queue threshold. The method further comprises gathering with a performance monitoring subsystem a set of business process data, and adjusting with a capacity management subsystem the capacity level of the capacity constraint in response to the set of business process data gathered by the performance monitoring subsystem.

17 Claims, 5 Drawing Sheets

U.S. PATENT DOCUMENTS

| | | |
|---|---|---|
| 2003/0177081 A1 | 9/2003 | Woehr |
| 2004/0039625 A1 | 2/2004 | Malnack et al. |
| 2004/0172341 A1* | 9/2004 | Aoyama et al. ............... 705/26 |
| 2004/0186605 A1* | 9/2004 | Wu et al. ..................... 700/102 |
| 2005/0165635 A1* | 7/2005 | Moessner .................... 705/10 |
| 2005/0195741 A1* | 9/2005 | Doshi et al. ................. 370/230 |

OTHER PUBLICATIONS

"The WSLA Framework: Specifying and Monitoring Service Level Agreements for Web Services", Keller, Alexander; Ludwig, Heiko; Journal of Network and Systems Management, vol. 11, No. 1, Mar. 2003.*

"Defining and Monitoring Service Level Agreements for Dynamic e-Business",Keller, Alexander; Ludwig, Heiko; pp. 189-204 of the Proceedings of LISA '02: Sixteenth Systems Administration Conference,(Berkeley, CA: USENIX Association, 2002).*

"Setting Job-Shop Due-Dates with Service-Level Constraints" Bookbinder, James H.; Noor, Afzal Ibn; The Journal of the Operational Research Society, vol. 36, No. 11 (Nov. 1985), pp. 1017-1026.*

"Using Control Theory to Achieve Service Level Objectives in Performance Management", Parekh, s.; Gandhi, N.; Hellerstein, J.; Tilbury, D.; Jayram, T.; Bigus, J.; Real-Time Systems, 23, 127-141, 2002 (c) 2002 Kluwer Academic Publishers.*

Hur et al. (Real-Time schedule adjustment decisions: a case study; Mabert, Vincent A.; Bretthauer, Kurt M.; Omega 32(2004)333-344).*

Christin et al. (A Quantitative Assured Forwarding Service; Christin, Nicolas; Liebeherr, Jorg; Abdelzaher, Tarek F.; Technical Report: University of Virginia, CS-2001-21).*

Real-Time schedule adjustment decisions: a case study, Hur, Daesik; Mabert, Vincent A.; Bretthauer, Kurt M.; Omega 32(2004)333-344.*

Hamminds, et al. "Service Monitoring and Control." Microsoft Corporation. Archived on Apr. 13, 2003 by the Internet Archive: <http://web.archive.org/web/20030413074004/www.microsoft.com/technet/itsolutions/msm/smf/smfsmc.asp>. pp. 1-74.*

A Quantitative Assured Forwarding Service Christin, Nicolas; Liebeherr, Jorg; Abdelzaher, Tarek F.; Technical Report: University of Virginia, CS-2001-21.*

"Feedback control with queueing-theoretic prediction for relative delay guarantees in web servers", Ying Lu; Abdelzaher, T.; Chenyang Lu; Lui Sha; Xue Liu; Dept. of Comput. Sci., Virginia Univ., Charlottesville, VA,USA; Real-Time and Embedded Technology and Applications Symposium, 2003. Proceedings. The 9th IEEE Publication Date: May 27-30.*

Constraints Management Group, LLC, (CMG) "Constraints Management User Conference 2004—Highlights of our Second Annual User Conference", 2004.

Constraints Management Group (CMG), "Constraint Management (DBR) Scheduling and Software", Constraints Management User Conference 2004, May 18-21, 2004, pp. 1-30.

Constraints Management Group (CMG), "Applied Buffer Management", Constraints Management User Conference 2004, May 18-21, 2004, pp. 1-47.

Steyn, H., "Synchronising Resources to Maximise the Work Performed on Concurrent Projects", Critical Chain Symposium 2002.

Brown, T. P., "Multi-Project Critical Chain and Buffer Management for Capital and Innovation Projects", Critical Chain Symposium 2002.

Anderson, David J., "Making the Business Case for Agile Management—Simplifying the Complex System of Software Engineering", Jul. 12-15, 2004, pp. 1-13.

Marshall, C.R., "Improving Business Performance by Managing Constraints", Central Wisconsin Economic Research Bureau, Division of Business and Economics, Univ. of Wisconsin-Stevens Point, 2002.

Simons, et al., "An Exposition of Multiple Constraint Scheduling as Implemented in the Goal System (Formerly Disaster)", Production and Operations Management Society, vol. 6, No. 1, pp. 3-22, Spring 1997.

O'Donovan, B., "Managing Supply Chain Performance in Electronic Organisations: A TOC Approach", Faculty of Information and Engineering Systems, Leeds Metropolitan University, Section 1, pp. 36-44, 2003.

Hagan L., "Improving Journal Quality with Process Improvement Methods", The Sheridan Press, White Paper, May 2000.

Lilly Software Associates, Inc., "Manufacturing: Drum-Buffer-Rope", Visual DBR, 2004.

M2M MADE2MANAGE Systems, "With TOC and M2M Synchronizer, Abba Systems Conquers Barriers to Growth".

* cited by examiner

METHOD AND SYSTEM OF MANAGING A BUSINESS PROCESS

FIELD OF THE INVENTION

The present invention relates to a method and system for managing capacity in a business process on demand. More particularly, the present invention relates to a method and system for managing capacity in a business process on demand by adjusting the capacity level of one or more constraints as demand increases or decreases.

BACKGROUND OF THE INVENTION

One approach to managing a business process, such as, a manufacturing process that provides a finished product to a customer is to use planning cycles that involve creating a forecast to try to anticipate future needs. Operating a manufacturing process at an optimum efficiency level requires knowledge of the one system constraint (one machine type) that limits what the manufacturing plant can produce. Moreover, the manufacturing process tries to avoid any floating constraints, given that as soon as the constraint moves from one machine to another, the old production schedule becomes suboptimal or even unfeasible, and the manufacturing plant has to be rescheduled to get the plant back to an optimum efficiency level. Thus, in a manufacturing process, the capacity is deliberately unbalanced so that the system constraint rarely, if ever, floats (moves) from one machine to another. In particular, the system constraint, one machine type, may run all the time, while the non-constraints, that is, other machine types only run as often as necessary to keep up with the system constraint. Thus, the manufacturing process uses a feedback mechanism that maximizes the flow of work through the system by regulating the production of the system constraint (by utilizing the system constraint to its fullest) while limiting the system inputs to the maximum amount of work that the constraint can handle (by utilizing any non-constraints only as needed to keep up with the system constraint) in order to maximize production. However, in a business process that provides a service to a service requester, it is not practical or affordable to unbalance capacity, that is, the business or enterprise cannot afford to have a lot of personnel sitting idle just in case work level increases unexpectedly. Accordingly, when the capacity cannot be unbalanced or fixed, it often leads to floating constraints, where a constraint that used to be a constraint is no longer a constraint, while a non-constraint becomes the constraint. Further, the business or enterprise that provides services to service requesters are expected to meet demand even when demand is variable and capacity cannot be fixed and to provide the services within specific timeframes to avoid serious consequences. Moreover, increasingly, business processes that are not a core competency within an enterprise are outsourced to an outsourcer, with the enterprise expecting the outsourcer not only to operate the business process on demand, that is, where the demand is variable, the due dates are inflexible, and capacity cannot be fixed, but the outsourcer is also expected to improve service levels. Accordingly, it is imperative that an enterprise or outsourcer that provides a service examine ways to manage a business process on demand in order to meet or provide consistent service levels and to avoid any declines in service levels.

SUMMARY OF THE INVENTION

In a first aspect of the invention, there is provided a method of managing capacity for providing a service to a service requester. The method comprises the steps of providing a business process having one or more service inputs, at least one service output, at least one capacity constraint having a capacity level and a queue located ahead of the capacity constraint having an upper queue threshold and a lower queue threshold. The method further comprises gathering with a performance monitoring subsystem a set of business process data, and adjusting with a capacity management subsystem the capacity level of the capacity constraint in response to the set of business process data gathered by the performance monitoring subsystem. The gathering by the performance monitoring subsystem step further comprises analyzing the set of business process data gathered and transmitting a recommendation to the capacity management subsystem to adjust either upward or downward the capacity level of the capacity constraint based on the set of business process data gathered. Further, the gathering with a performance management subsystem step further comprises linking the performance monitoring subsystem to the capacity management subsystem, such that the set of business process data gathered by the performance monitoring subsystem is transmitted to the capacity management subsystem in a timely manner. Further, the performance management subsystem continuously updates the set of business process data and transmits in a timely manner the set of business process data that has been updated to the capacity management subsystem, such that the capacity management subsystem accommodates any change in the capacity constraint.

Preferably, the business process has a feedback loop from the capacity constraint to the capacity management subsystem. In a preferred embodiment, the set of business process data gathered by the performance monitoring subsystem comprises service input data for the one or more service inputs, service output data for a plurality of service factors associated with the service output, capacity constraint data for the capacity constraint, non-constraint data for each non-constraint, and queue data for the queue ahead of the capacity constraint. Further, the adjusting with a capacity management subsystem the capacity level of the capacity constraint step comprises at least one of: activating alternate web sites, adding shifts, removing shifts, adding personnel, removing personnel, resuming normal operations, reducing work schedules, increasing work schedules, reassigning resources between business processes for services utilizing the same process, reassigning resources among clients using the same process, accelerating non-critical tasks, deferring non-critical tasks, bumping critical service inputs to the front, substituting automated processing for non-automated processing, hiring subcontractors, releasing subcontractors, obtaining resources, and shedding resources. Preferably, the one or more service inputs comprises one of service requests and service transactions, and the plurality of service factors associated with the service output comprises speed, cost, quality and scope. Further, preferably, the service requests comprises at least one of: in-person contact by service requesters, phone calls, faxes and text messages, and the service transactions comprises at least one of paper documents and digital records.

In another embodiment of the invention, there is provided a method of achieving a desired service level for one or more of a plurality of service factors for providing a service to a service requester, the method comprises the steps of providing a business process having one or more service inputs, one or more service outputs, one or more capacity constraints, each of the one or more capacity constraints having a capacity level, a buffer with an upper buffer threshold and a lower buffer threshold located ahead of each of the one or more capacity constraints. The method further comprises measuring with a performance monitoring subsystem a set of business process data including service input data for the one or more service inputs, service output data for the one or more service outputs, capacity constraint data for the one or more capacity constraints, non-constraint data for each non-constraint, and queue data for the queue ahead of each of the one or more capacity constraints. Further, the method comprises transmitting the set of business process data measured by the performance monitoring subsystem to a capacity management subsystem in a timely manner and directing the capacity management subsystem to adjust the capacity level of the one or more capacity constraints in response to the set of business process data transmitted by the performance monitoring subsystem in order to achieve the desired service level for the one or more of the plurality of service factors that are associated with the one or more service outputs. The measuring with a performance monitoring subsystem step further comprises measuring an existing service level for each of the set of business process data, including an existing service level for the plurality of service factors associated with the one or more service outputs. Further, the directing the capacity management subsystem step further comprises evaluating with the performance monitoring subsystem the set of business process data measured by the performance monitoring subsystem before transmitting the set of business process data to the capacity management subsystem and instructing the capacity management subsystem to adjust either upward or downward the capacity level of the one or more capacity constraints in order to achieve the desired service level for the one or more of the plurality of service factors. Furthermore, the directing the capacity management subsystem to adjust the capacity level of the one or more capacity constraints step further comprises one or more of the following: activating alternate web sites, adding shifts, removing shifts, adding personnel, removing personnel, resuming normal operations, reducing work schedules, increasing work schedules, reassigning resources between business processes for services utilizing the same process, reassigning resources among clients using the same process, accelerating non-critical tasks, deferring non-critical tasks, bumping critical service inputs to the front, substituting automated processing for non-automated processing, hiring subcontractors, releasing subcontractors, obtaining resources, and shedding resources. Preferably, the one or more service inputs comprises one of service requests and service transactions, and the plurality of service factors associated with the service output comprises speed, cost, quality and scope. Further, preferably, the service requests comprises at least one of: in-person contact by service requesters, phone calls, faxes and text messages, and the service transactions comprises at least one of paper documents and digital records.

In yet another embodiment of the invention, there is provided a programmable media containing programmable software to manage capacity in a business process. The programmable software comprises the steps of gathering with a performance monitoring subsystem a set of data from the business process having one or more service inputs, at least one service output, at least one capacity constraint having a capacity level, and a queue having an upper queue threshold and a lower queue threshold located ahead of the capacity constraint, transmitting in a timely manner the set of data gathered by the performance monitoring subsystem to a capacity management subsystem and adjusting with the capacity management subsystem the capacity level of the capacity constraint either upward or downward in response to the set of data transmitted by the performance monitoring subsystem. In a preferred embodiment, the set of data from the business process comprises at least one of service input data for the one or more service inputs, service output data for the service output, capacity constraint data for the capacity constraint, non-constraint data for any non-constraints and queue data for the queue ahead of the capacity constraint. Preferably, the performance monitoring subsystem is directly linked to each of the one or more service inputs, each of the one or more service outputs, each of the capacity constraint, any non-constraints, and the queue ahead of each of the capacity constraint and the capacity management subsystem.

Further, in yet another embodiment of the invention, there is provided a method of providing a service to a service requester, the method comprises the steps of providing a business process having one or more service inputs, one or more service outputs, one or more capacity constraints, each of the one or more capacity constraints having a capacity level, a queue with an upper queue threshold and a lower queue threshold located ahead of each of the one or more capacity constraints. Further, the method includes the steps of measuring with a performance monitoring subsystem a set of business process data, including non-constraint data pertaining to any non-constraints in the business process, evaluating the set of business process data with the performance monitoring subsystem, transmitting in a timely manner the set of business process data from the performance monitoring subsystem to a capacity management subsystem and directing the capacity management subsystem to adjust either upward or downward the capacity level of the one or more capacity constraints in response to the set of business process data transmitted by the performance monitoring subsystem. In a preferred embodiment, the set of data from the business process comprises at least one of service input data for the one or more service inputs, service output data for the service output, capacity constraint data for the capacity constraint, non-constraint data for any non-constraints and queue data for the queue ahead of the capacity constraint.

BRIEF DESCRIPTION OF THE DRAWINGS

The accompanying drawings, which are incorporated in and form a part of this specification, illustrate embodiments of the invention and, together with the description, serve to explain the principles of the invention.

BEST MODE FOR CARRYING OUT THE INVENTION

It will be apparent to those skilled in the art that various modifications and variations can be made to the present invention without departing from the spirit and scope of the invention. Thus, it is intended that the present invention cover the modifications and variations of this invention provided they come within the scope of the appended claims and their equivalents. Reference will now be made in detail to the preferred embodiments of the invention.

In one embodiment, the present invention provides a method of managing capacity in an on demand business process that provides a service to a service requester. Preferably, the invention provides an improved business process for providing a service as compared to a manufacturing process that manufactures a physical product as the output. As used herein, the term "on demand" means to make changes in a business process when the need arises as opposed to trying to anticipate needs during a planning cycle using a forecast. Responding on demand does not require a forecast, but it does require the capability or ability to make changes rapidly in the business process, as needed. In particular, the invention provides a method of managing capacity in an on demand business process having one or more service inputs, at least one service output, at least one capacity constraint and a queue located ahead of the capacity constraint. In a preferred embodiment, the queue has an upper queue threshold and a lower queue threshold and the capacity constraint has a capacity level. In a preferred embodiment, the one or more service inputs include service requests and service transactions, where, service requests include in-person contact by service requesters, phone calls, faxes and text messages and service transactions include paper documents and digital records. Further, in one embodiment, service requests are service inputs handled by human resources, whereas, service transactions are service inputs that are processed, preferably, using Information Technology resources, such as, a software program that is installed on a computer system or on a computer network or on a designated server. Further, the term "service output" simply refers to the completed service request or service transaction in a process. As used herein, the term "capacity constraint(s)" is intended to include not only one or more specific tasks in a business service context that may be constraint(s), but is intended to also include human resources, that is, different types of personnel, such as, generalists, specialists and subject matter experts (SMEs), as well as Information Technology (IT) resources, for instance, web servers, various types of equipment used in the business process, communication lines and other such IT resources that may be capacity constraints in the business process. Further, as used herein, the term "queue" or "buffer" refers to requests and/or transactions that pile up ahead of the capacity constraints in the business process. In general, unlike a "stack" where items are put on top of a pile and removed from top of the pile, that is, follows the "last in, first out" (LIFO) rule, a queue ahead of a capacity constraint in a business process follows the "first in, first out" (FIFO) rule, where items (requests and transactions) enter the line at one end and exit the line from the other end. Moreover, in a business process, a request/transaction can be designated as critical and can be given priority, such as, in the case of a 911 call in a queue. In such situations, the critical request/transaction can be expedited (referred to as "queue jumping") either by moving the request/transaction to the head of the queue or alternatively, by routing the request/transaction to a site that provides expedited or special services. Furthermore, the term "queue level" or "buffer level" refers to the size of the queue or buffer, that is, the number of requests/transactions in the queue or buffer. As such, a capacity constraint can exist anywhere in a business process where service requests and service transactions pile up (the queue) ahead of a task/resource (the constraint) given that the capacity of that constraint (task/resource) is insufficient to handle the demand at the moment.

More particularly, the present invention provides a method of managing capacity in a business process to respond on demand to changes in volume, changes in mix of inputs, or changes in the process itself. As used herein, "changes in volume" refers to the number of incoming service requests or service transactions. The rate of incoming service inputs (service requests and transactions) and the capacity of the process to fulfill or complete those service inputs (requests or transactions) affect the queue level. For instance, if the rate at which service inputs are handled is greater than the rate at which new service inputs arrive, then the queue or buffer level is likely to decrease. However, if the rate at which service inputs are handled is less than the rate at which new service inputs arrive, then the queue level is likely to increase. However, the queue level cannot increase indefinitely or else service levels are likely to decline. Thus, in the process, the performance monitoring subsystem monitors the queue level of the queue ahead of the capacity constraint, such that, if the queue level reaches either the upper queue threshold (upper limit) or the lower queue threshold (lower limit), the performance monitoring subsystem directs the capacity management subsystem to adjust the capacity level of the capacity constraint, as needed. The term "mix of inputs" or "input mix" refers to the proportion of various service requests or service transaction types, whereas, the phrase "changes in the process itself" refers to changes in procedures that may or may not transform the overall business process.

The method of managing capacity further includes gathering or collecting a set of business process data, preferably, with a performance monitoring subsystem, and linking or coupling the performance monitoring subsystem to a capacity management subsystem, such that the set of business process data gathered by the performance monitoring subsystem is transmitted in a timely manner to the capacity management subsystem. Further, the method comprises adjusting, preferably, with a capacity management subsystem, the capacity level of the capacity constraint in response to the set of business process data gathered by the performance monitoring subsystem and transmitted to the capacity management subsystem. In a preferred embodiment, the gathering by the performance monitoring subsystem step further comprises the performance monitoring subsystem evaluating or analyzing the set of business process data gathered and transmitting a recommendation or instruction to the capacity management subsystem to adjust either upward or downward the capacity level of the capacity constraint based on the set of business process data gathered and evaluated. In particular, the performance monitoring subsystem continuously updates the set of business process data, focusing on the queue level of the queue ahead of the one or more capacity constraints, as well as the service input levels and the service output levels, and transmits in a timely manner the updated set of business process data to the capacity management subsystem, so that the capacity management subsystem can make an informed decision with respect to adjusting the capacity level of the capacity constraint in response to any changes in the volume, input mix or any procedure in the business process.

Figure 1:
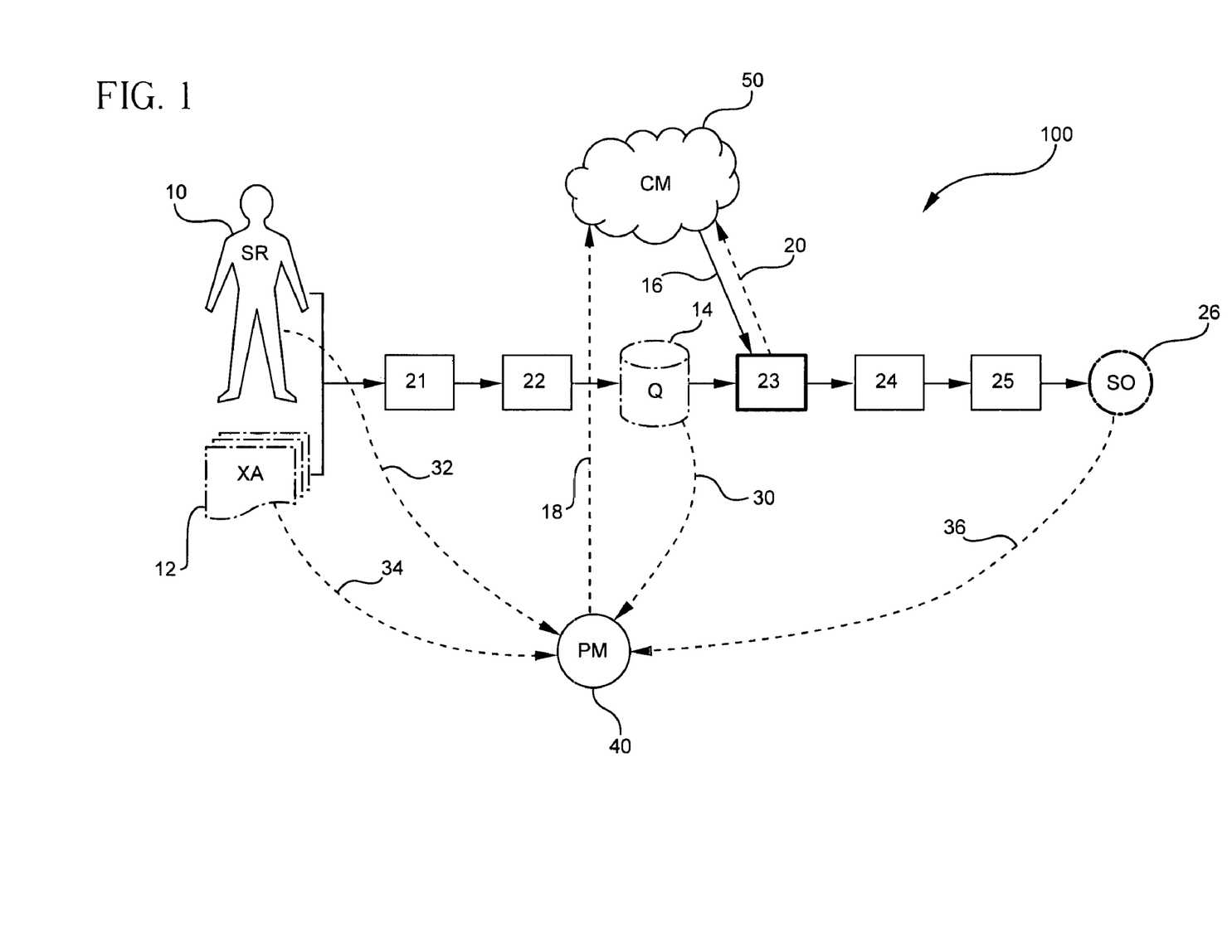
FIG. 1 illustrates a diagram for a method of managing capacity with a capacity management subsystem in a business process having a single constraint, in accordance with an embodiment of the present invention.

Preferably, the performance monitoring subsystem gathers a set of business process data or information that includes service input data for each of the service inputs, service output data for the service output(s), capacity constraint data for the capacity constraint(s), non-constraint data for each non-constraint, and queue data for each queue ahead of the capacity constraint(s). As used herein, the term "service input data" is intended to include any and all data or information pertaining to any of the service inputs in the process. In a preferred embodiment, the performance monitoring subsystem gathers service input data that includes one or more of the following data or information: itemization of incoming service request counts and service transactions counts by geography, product, language, type of service request or service transaction, severity/urgency of service request or service transaction, customer segment, time of day, day of week, etc. based on the fact that some items may require more time on the constraint, some time periods are peak processing periods, and some service requests or service transactions deserve higher priority. Further, as used herein, the term "service output data" is intended to include any and all data or information pertaining to any of the service outputs in the process, including data pertaining to a plurality of service factors or measurements associated with any of the service outputs. More preferably, the plurality of service factors or measurements associated with a service output includes speed, cost, quality and scope. In particular, the performance monitoring subsystem collects service output data that includes one or more of the following data: maximum time to complete service requests during a defined interval of time (hour, day, week, month), quartiles on service request or service transaction processing times, rejection rates (for instance, number of service transactions that cannot be processed due to missing/inconsistent data), error rates (for instance, number of service transactions suspended/reworked because their processing was incorrect), resubmission rates (for instance, number of service requests resubmitted because they did not meet requester's needs even though the processing was correct), total cost to service all service requests during a defined interval, average cost per service request, etc. Moreover, the term "capacity constraint data" is intended to include any and all data pertaining to any capacity constraint in the process. In a preferred embodiment, the performance monitoring subsystem gathers capacity constraint data that includes one or more of the following data or information: reliability of the constraint (for instance, percent of time constraint is unable to handle service request or service transaction), planned downtime on the constraint (for instance, to bring more web servers on line it may be necessary to temporarily suspend processing on the current servers), and rate at which capacity can be increased/decreased. Further, the term "non-constraint data" is intended to include data or information pertaining to any non-constraint(s), including any "capacity constrained resources" (CCRs) in the business process. A "non-constraint" is defined as any task/resource that has a large amount of spare or protective capacity relative to the current or existing capacity constraint, whereas, a "capacity constrained resource" is defined as any task/resource that has very little spare or protective capacity relative to the current or existing capacity constraint and, thus, capacity constrained resources are places where multiple or floating constraints are likely to emerge if the capacity level of the current capacity constraint is elevated. In a preferred embodiment, the performance monitoring subsystem gathers non-constraint data for both any non-constraints and any capacity constrained resources, which includes spare capacity of each non-constraint, including any capacity constrained resources relative to the current or existing capacity constraint(s), the maximum amount by which the capacity level of each non-constraint or capacity constrained resource can be increased in the short term, the time required to change the capacity level of each non-constraint or capacity constrained resource, and the cost required to change the capacity level of each non-constraint or capacity constrained resource. Furthermore, the term "queue data" is intended to include data or information pertaining to any queue ahead of any existing constraint in the process. Preferably, the performance monitoring subsystem gathers queue data that includes one or more of the following: queue level, number of times per period that the queue level goes beyond the upper queue threshold or lower queue threshold, length of time the queue level stays beyond an upper or lower queue threshold, and variance or standard deviation of the queue level Reference is now made to FIG. 1, which illustrates a method of managing capacity in an on demand business process having at least one capacity constraint, in accordance with an embodiment of the invention. Referring to FIG. 1, the overall business process is represented by the numeral 100, with numerals 10 and 12 representing the service inputs for the business process 100 and the numeral 26 representing the service output (SO) for the business process 100. In particular, the number 10 represents service requests (SR), which can include an input mix of in-person contact by service requesters, phone calls, faxes and text messages. Further, the number 12 represents service transactions (XA), which can include an input mix of paper documents and digital records. In the business process 100 of FIG. 1, the service inputs 10 and 12 are processed via a series of tasks that are represented in FIG. 1 by symbols numbered 21 through 25. In particular, the service inputs 10 and 12 for business process 100 are first subject to task 21, then task 22, then task 23, then task 24 and then task 25 before the service request 10 or service transaction 12 is deemed to be completed, as represented by the service output 26. In the diagram of FIG. 1, the business process 100 is shown to have a single capacity constraint at task 23, and a queue or buffer at 14, which is located ahead of the capacity constraint 23. Further, the diagram in FIG. 1 depicts a capacity management (CM) subsystem 50 and a performance monitoring (PM) subsystem 40. As shown in FIG. 1, the performance monitoring (PM) subsystem 40 collects or gathers a set of business process data or information (as shown by the dotted lines 32, 34, 30 and 36 having a single-headed arrow pointing toward the performance monitoring subsystem 40). The set of business process data or information preferably includes data regarding each of the following: the service requests 10, as shown by the dotted line 32, the service transactions 12, as shown by the dotted line 34, the queue 14, as shown by the dotted line 30, and the service output 26, as shown by the dotted line 36. Preferably, the performance monitoring subsystem 40 also gathers information or data pertaining to each of the non-constraints 21, 22, 24 and 25 (not specifically shown in FIG. 1).

In particular, the performance monitoring subsystem 40 gathers service input data for the service inputs 10 and 12, service output data for a plurality of service factors associated with the service output 26, capacity constraint data for the capacity constraint 23, non-constraint data for each of the non-constraints 21, 22, 24 and 25, and queue data for the queue 14 ahead of the capacity constraint 23. Given that in any business process, a true measurement of the service output is usually in terms of the completed service requests or the completed service transactions, the service output data that is gathered or collected is in terms of service levels associated with a plurality of service factors or measurements pertaining to the service output. In a preferred embodiment, the plurality of service factors or service measurements associated with the service output 26 include, speed, cost, quality and scope of the services being provided by the business. For instance, the performance monitoring subsystem 40 may gather service level data for various costs associated with a particular service output, such as, the total cost to service all service requests during a defined interval or the average cost per service request. Similarly, service level data for the quality associated with a particular service output (for instance, the customer satisfaction level) can be gathered by the performance monitoring subsystem 40.

Furthermore, as shown in FIG. 1, the performance monitoring subsystem 40 is linked, preferably, directly to the capacity management subsystem 50, as shown by the dotted line 18 having a single-headed arrow pointing towards the capacity management subsystem 50, such that the set of business process data gathered or collected by the performance monitoring subsystem 50 can be transmitted to the capacity management subsystem in a timely manner. In particular, the performance monitoring subsystem 40 analyzes or evaluates the set of business process data gathered from the service inputs 10 and 12, the queue 14 and the service output 26 and transmits to the capacity management subsystem 50 the set of business process data gathered or collected in the form of a recommendation or instruction 18 to either increase or decrease the capacity level of the capacity constraint 23. In response to the recommendation or instruction 18 transmitted by the performance monitoring subsystem 40 to the capacity management subsystem 50, the capacity management subsystem 50 adjusts either upward or downward the existing or current capacity level of the capacity constraint 23. In particular, the capacity management subsystem 50 issues a directive (as indicated by the solid line 16 having a single-headed arrow pointing toward the capacity constraint 23), to change the capacity level either upward or downward based on the set of business process data or information the capacity management subsystem 50 receives from the performance monitoring subsystem 40. Further, in a preferred embodiment, the capacity management subsystem 50 receives a confirmation (as shown by the arrow 20) that the capacity level of the capacity constraint 23 has been adjusted in accordance with the directive issued by the capacity management subsystem 50. As can be seen in FIG. 1, there is an indirect flow of business process data or information in that the capacity management subsystem 50 does not directly gather or receive the set of business process data from the service inputs 10 and 12, the queue 14 and the service output 26, but rather the set of business process data or information regarding the service inputs 10 and 12, the queue 14 and the service output 26 is first gathered by the performance monitoring subsystem 40, evaluated and then transmitted to the capacity management subsystem 50. In other words, the capacity management subsystem 50 receives the set of business process data indirectly from the performance monitoring subsystem 40, only after the business process data has been analyzed or evaluated by the performance monitoring subsystem 40. Further, given that the performance monitoring subsystem 40 receives all data and information pertaining to the business process, the performance monitoring subsystem 40 and ultimately the capacity management subsystem 50 is able to make better capacity adjustment decisions versus the case where if all the capacity management subsystem 50 received was data or information pertaining to the level of the queue 14. For instance, if the level of the queue 14 is greater that the upper queue threshold, but the demand for services (that is, the service requests 10 and service transactions 12) is decreasing, while the service level of one or more of the plurality of factors associated with the service output 26, for instance, the speed and quality of the service are improving or increasing, the performance monitoring subsystem 40 may recommend that the capacity management subsystem 50 make no change in the level of capacity for the capacity constraint 23 given that the service levels will eventually decrease or return to normal without any capacity adjustment.

In a preferred embodiment, the capacity management subsystem comprises both an Information Technology (IT) component and a human resource component. Similarly, the performance monitoring subsystem comprises both an Information Technology component and a human resource component. Preferably, the Information Technology component of both the capacity management subsystem and the performance monitoring subsystem includes a computer system having software installed thereon that is specific to managing a particular business process. For instance, customized software applications can be developed for a particular business process to perform any or all of the functions carried out by the performance monitoring subsystem (such as, monitoring, evaluating, transmitting, etc.) and the functions carried out by the capacity management subsystem (such as, any step taken to adjust the capacity level of one or more capacity constraints). Similarly, both the performance monitoring subsystem and capacity management subsystem each include a human resource component, that is, have people that are decision makers. For instance, decision makers in the performance monitoring subsystem may oversee any automated recommendations made by the IT component to the capacity management subsystem and can manually override an automated recommendation, for instance, in light of an existing service level agreement that has been negotiated between the service provider and the service requester. Similarly, decision makers in the capacity management subsystem oversee any automated adjustment directives that are to be issued to adjust the level of capacity of one or more capacity constraints and can manually override the carrying out of the directive in cases where it is not logistically possible to increase the capacity level of a capacity constraint or where it may be financially unfeasible or not cost-effective to carry out the adjustment directive.

In a preferred embodiment, the step of adjusting with a capacity management subsystem the capacity level of the capacity constraint includes a wide range of actions to increase the capacity level or to decrease the capacity level, including one or more of the following actions: activating alternate web sites to increase the capacity level, adding shifts to increase the capacity level, removing shifts to decrease the capacity level, adding personnel to increase the capacity level, removing personnel to decrease the capacity level, resuming normal operations to decrease the capacity level, reducing work schedules to decrease the capacity level, increasing work schedules to increase the capacity level, reassigning resources between business processes for services utilizing the same process to increase or decrease the capacity level, reassigning resources among clients using the same process to increase or decrease the capacity level, accelerating non-critical tasks or deferring non-critical tasks to level work loads, bumping critical service inputs (requests or transactions) to the front in order to manage the queue, substituting automated processing, such as, Integrated Voice Response (IVR) for non-automated processing by a live agent, hiring subcontractors to increase the capacity level, releasing subcontractors to decrease the capacity level, obtaining resources to increase the capacity level, and shedding resources to decrease the capacity level.

In yet another embodiment of the invention, the invention provides a method of achieving a desired or target service level for one or more of a plurality of service factors associated with a business process that provides a service to a service requester. As used herein, the term "plurality of service factors" refers to one or more service factors associated with the service output of a business process, including service factors such as, speed, cost, quality and scope, where each service factor provides a measurement of an aspect of a service output in a business process. In particular, the method comprises providing a business process having one or more service inputs, one or more service outputs, one or more capacity constraints with each capacity constraint having a capacity level, and a buffer with an upper buffer threshold and a lower buffer threshold located ahead of each of the capacity constraints. The method further comprises measuring with a performance monitoring subsystem a set of business process data including service input data for the one or more service inputs, service output data for the one or more service outputs, capacity constraint data for the one or more capacity constraints, non-constraint data for each non-constraint, and queue data for the queue ahead each of the one or more capacity constraints. The term "service input data" is intended to include any data or information pertaining to any of the service inputs, including service requests and/or service transactions. Similarly, the term "service output data" includes any data or information pertaining to any of the service outputs. The term "capacity constraint data" includes data or information pertaining to any existing constraint(s) in the process, and the term "non-constraint data" refers to any non-constraints in the process, and whereas, the term "queue data" includes data or information pertaining to any queue ahead of the existing constraint(s) in the process. Further, the term "desired service level" or "target service level" refers to a negotiated service level that is to be achieved when providing a service to a service requester. Frequently, when a service provider provides a service to a service requester, a desired or target service level is negotiated for one or more of the service factors associated with the service, namely, speed, cost, quality and scope of the business process. Hence, when providing the service, the service provider needs to try and achieve the desired or target service level that has been set or agreed upon by the parties in order to avoid any negative consequences. In order to achieve the desired or target service level(s) negotiated, the service provider also needs to determine the resources that are going to be required in order to achieve the desired or target service level.

In a preferred embodiment, the performance monitoring subsystem measures an existing service level for each of the set of business process data, including an existing service level for the plurality of service factors associated with the one or more service outputs. Preferably, the plurality of service factors associated with the service output comprises speed, cost, quality and scope. The method further comprises transmitting in a timely manner the set of business process data measured by the performance monitoring subsystem to a capacity management subsystem, and directing the capacity management subsystem to adjust the capacity level of the one or more capacity constraints in response to the set of business process data transmitted by the performance monitoring subsystem in order to achieve the desired service level for the one or more of the plurality of service factors that are associated with the one or more service outputs. Preferably, the directing the capacity management subsystem step further comprises evaluating with the performance monitoring subsystem the set of business process data measured by the performance monitoring subsystem and instructing the capacity management subsystem to adjust either upward or downward the capacity level of the one or more capacity constraints based on the set of business process data evaluated and in order to achieve the desired service level for any one of the service factors associated with the service output of the business process. In particular, the performance monitoring subsystem continuously measures, updates and evaluates the set of business process data. Preferably, the evaluating step performed by the performance monitoring subsystem includes evaluating the queue level of the queue ahead of the one or more capacity constraints, as well as evaluating the existing service input levels measured, evaluating the existing service output levels measured and evaluating the capacity level of the existing capacity constraints in the process. Accordingly, when the performance monitoring subsystem monitors and evaluates or determines that one or more service levels associated with the service output is declining due to inadequate capacity at a constraint, the performance monitoring subsystem directs the capacity management subsystem to increase capacity on that constraint until desired or target service levels are restored. Preferably, the performance monitoring subsystem 40 concurrently monitors various service levels, for instance, speed, cost, quality and scope of a business process, such that, any one of these service level goals is not achieved at the expense of the other service levels in the business process. Again, the performance monitoring subsystem gathers and evaluates any non-constraint data, especially data pertaining to a capacity constrained resource given that a capacity constrained resource, by definition, is more likely to become a capacity constraint. For instance, if the performance monitoring subsystem gathers and evaluates the non-constraint data regarding the short term maximum amount by which the capacity level of a capacity constrained resource can be increased and determines that the short-term maximum amount by which the capacity level of the capacity constrained resource can be increased is relatively small, the performance monitoring subsystem may consider or decide to implement more long-term capacity planning. Further, the shorter the time required to change capacity on each non-constraint or capacity constrained resource, the less spare capacity is required to prevent the constraint from floating to a capacity constrained resource (assuming that the short-term maximum amount by which the capacity level of each capacity constrained resource can be increased is sufficient), which can impact one of more of the service levels. Moreover, the higher the cost is to change the capacity level on a non-constraint or capacity constrained resource, the less desirable it is to change capacity only for short periods. Thus, the method enables a business service provider to meet and/or to provide the desired service levels with respect to the service output(s) and enables the service provider to avoid any unacceptable declines in service levels associated with the service output(s) in the process.

Figure 2:
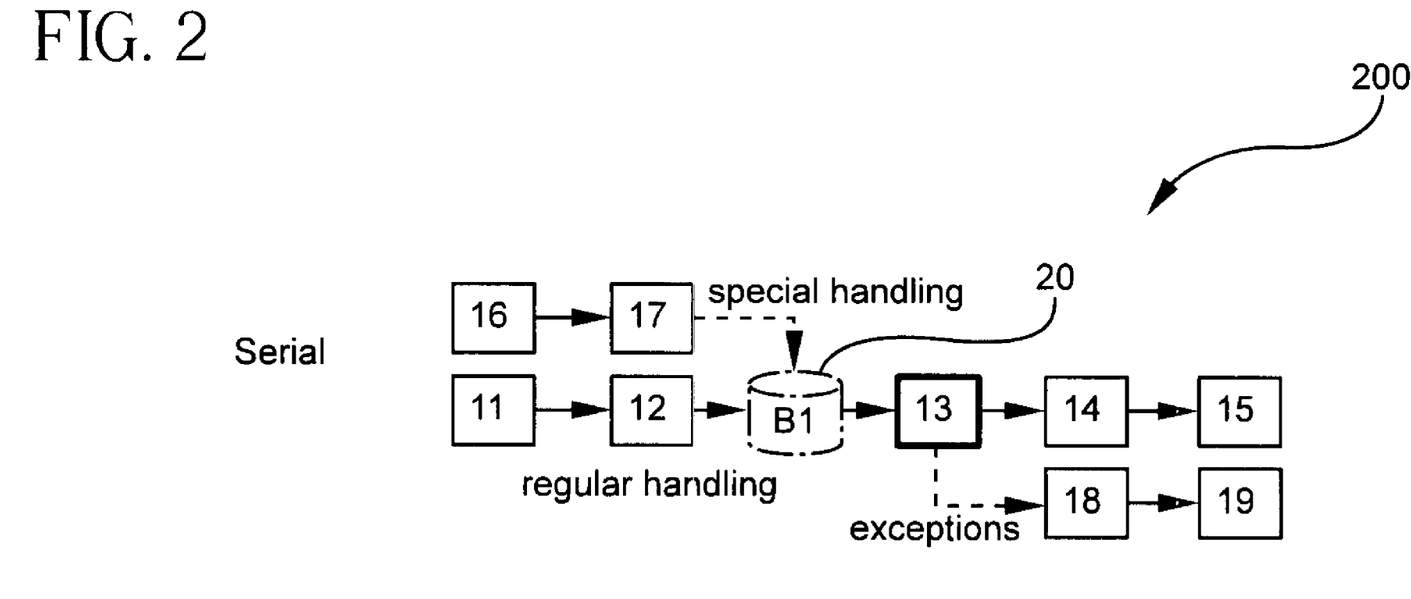
FIG. 2 illustrates a diagram for a method of managing capacity in a serial business process, in accordance with an embodiment of the present invention.

Turning to FIG. 2, FIG. 2 illustrates that even a simple serial business process 200 having its tasks arranged in a series, that is, where the service requests and service transactions are handled one at a time and go through the same steps, can comprise tasks that can have inbound and outbound branches (that are in addition to the regular handling path) for special handling and exceptions. As shown in FIG. 2, the numerals 16 and 17 represent an inbound branch of tasks that involve special handling of service requests and service transactions (not explicitly shown in FIG. 2), whereas, the numerals 11, 12, 13, 14 and 15 represent tasks that are handled in a regular manner for the business process 200. Also, FIG. 2 shows numerals 18 and 19, which represent an outbound branch for exceptional tasks in the process 200. Further, FIG. 2 shows a queue or buffer 20, which is of importance given that a capacity constraint exists at task 13. Monitoring the level of the queue or buffer 20 ahead of the capacity constraint 13 is of importance in managing capacity given that the capacity management subsystem needs queue data or information pertaining to queue 20 in order to adjust either upward or downward the capacity level of the capacity constraint 13. For instance, if incoming demand, that is, incoming service requests and service transactions, is greater than the capacity level of the capacity constraint 13, the queue level of queue 20 is likely to increase. However, if the incoming demand is less than the capacity level of the capacity constraint 13, the queue level of queue 20 is likely to decrease. Thus, the performance monitoring subsystem monitors the queue level of queue 20, so that the performance monitoring subsystem can transmit an appropriate recommendation as to whether the capacity level needs to be increased or decreased with respect to the capacity constraint 13. Although the capacity constraint 13 in FIG. 2 is shown to be in the regular handling path of the business process 200, the capacity constraint could move (float) to an atypical handling path, for instance, to task 16 in the special handling path or to task 18 in the exceptions handling path, especially during atypical conditions, such as, a marketing promotion, a busy season, and/or a natural disaster. Moreover, in FIG. 2, there could have been shown to be multiple capacity constraints that are present simultaneously in the business process 200.

Figure 3:
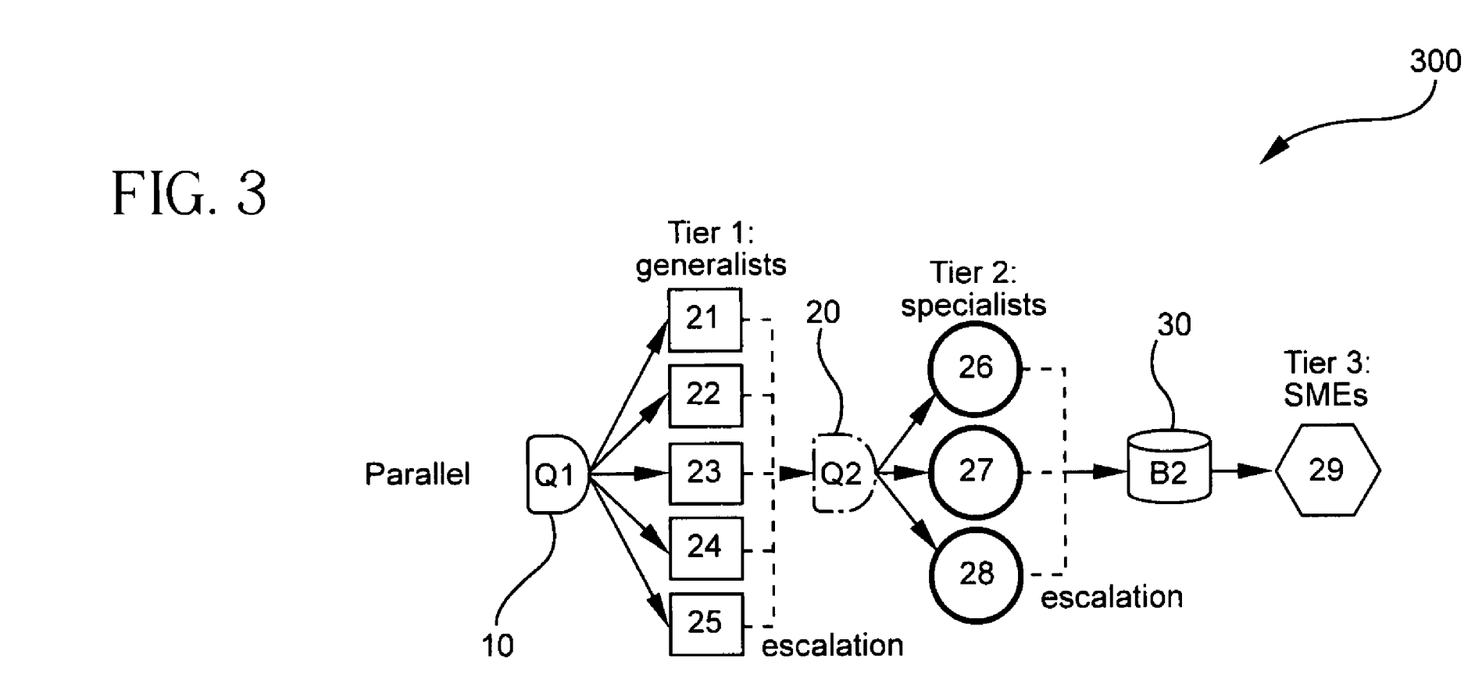
FIG. 3 illustrates a diagram for a method of managing capacity in a parallel business process, in accordance with an embodiment of the present invention.

In contrast to the serial business process 200 shown in FIG. 2, FIG. 3 illustrates a parallel business process 300, where service requests and service transactions (not explicitly shown in FIG. 3) can be handled concurrently by multiple resources, be it human resources and/or Information Technology (IT) resources. Each resource is capable of handling an aspect of the business process. What distinguishes a serial process (as shown in FIGS. 1 and 2) from a parallel process as shown in FIG. 3 is that in a serial process service requests and service transactions are handled one at a time, whereas, in a parallel process, more that one service request and/or service transaction is handled at a time. In particular, the example in FIG. 3 shows a parallel business processes that is shaped like a funnel, where service requests and service transactions that enter the wide end of the funnel are handled by generalists, which in turn get handled or escalated to the next narrower tier of specialists. Only the truly exceptional items make it to the highest and narrowest tier, where they are handled by subject matter experts (SMEs). However, a parallel process need not be shaped like a funnel. For example, in a grocery store, often there are multiple checkout lanes, where the multiple checkout lanes operate in a parallel manner, that is, serving multiple customers at once. Referring to FIG. 3, numerals 21, 22, 23, 24, 25, 26, 27, 28 and 29 each represent resources, with resources 21-25 being located at Tier 1, with resources 26-28 being located at Tier 2 and with resource 29 being located at Tier 3. In the funnel-type parallel process of FIG. 3, resources 21-25 in Tier 1 represent "generalists" that handle the business process 300, whereas, resources 26-28 in Tier 2 represent "specialists" that handle tasks that are passed on from the Tier 1 generalists, whereas, resource 29 in Tier 3 (the highest tier) represents subject matter experts (SMEs) that handle tasks that are passed on from the Tier 2 specialists. In the funnel-type parallel process shown in FIG. 3, it is expected that most of the tasks can be handled by the generalists in Tier 1 and that only those tasks that cannot be handled by the generalists get passed on to the specialists in Tier 2, and those tasks that cannot be handled by the specialists in Tier 2 get passed on to the subject matter experts in Tier 3. Thus, the number of resources available in Tier 2 is smaller than the resources available in Tier 1, and likewise the number of resources available in Tier 3 is smaller than the resources available in Tier 2. Further, as shown in FIG. 3, the capacity constraint is shown to be the Tier 2 resources 26, 27 and 28, given that there is an existing shortage of specialists for handling the existing queue level at 20. Instead of showing the capacity constraints (26, 27 and 28) to exist at the Tier 2 level, the capacity constraint could have been shown to be resource 29 at the Tier 3 level, given that usually tasks performed at higher tiers tend to cost more than tasks performed at lower tiers and, as such, are likely to be "capacity constrained resources" or "CCRs" (that is, non-constraints that have little protective capacity) and, thus, are locations where one or more capacity constraints are likely to develop. However, in this example, it is assumed that the subject matter experts (SMEs) in Tier 3 are provided by third parties as needed and, thus, Tier 3 is not likely to be a capacity constraint in this scenario. Moreover, the capacity constraint could have been shown to be located not only at resource 29, but at any other tier (such as, any of the resources 21 through 25 in Tier 1), especially if the work load is unevenly spread across the tiers. Further, as shown in FIG. 3, the queue 20 ahead of the Tier 2 capacity constraints 26-28 is of importance in the business process 300, since queue data or information regarding queue 20 will be collected or gathered by the performance monitoring subsystem (not explicitly shown in FIG. 3) and a recommendation will be transmitted to the capacity management subsystem (not explicitly shown in FIG. 3) to either adjust upward or downward the capacity level of one, two or all three of the capacity constraints 26, 27 and 28 in order to manage capacity in the business process 300. In FIG. 3, Tier 1, Tier 2 and Tier 3 can represent one site/location or can represent multiple sites/locations. Moreover, resources in a given tier can be located at different sites as well. For instance, resources 21, 22, 23, 24 and 25, can each be located at multiple sites.

Figure 4:
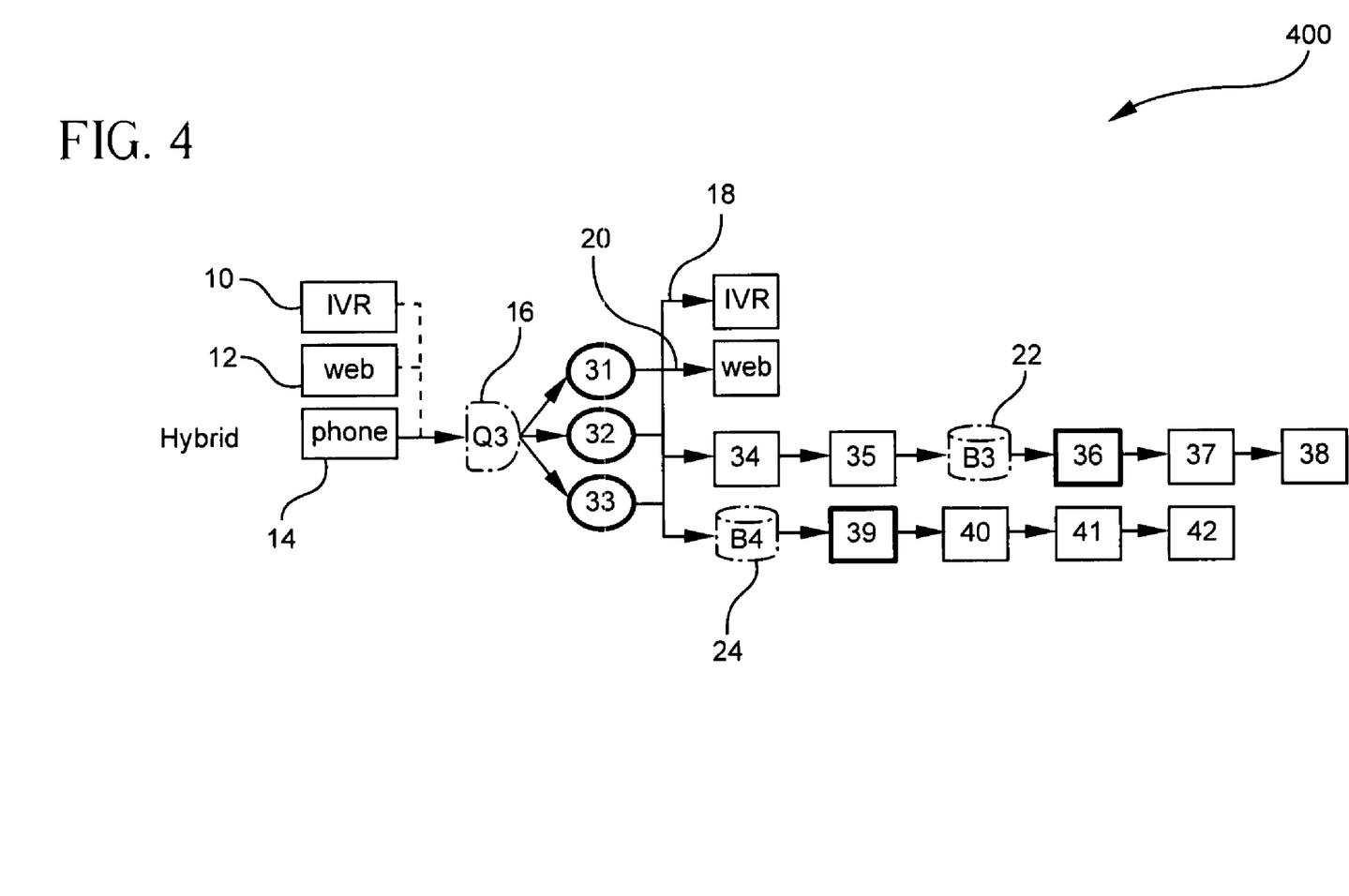
FIG. 4 illustrates a diagram for a method of managing capacity in a hybrid business process, in accordance with an embodiment of the present invention.

Often business processes can be complex and can have many steps, many paths and many resources. However, even in such complex processes, there are typically only a relatively small number of capacity constraints. Turning to FIG. 4, FIG. 4 illustrates a more complex hybrid business process 400, where tasks are arranged in both a serial and parallel fashion. In FIG. 4, service requests and service transactions (not explicitly shown in FIG. 4) can be handled entirely via self-service routes, such as, an Integrated Voice Response (IVR) unit 10 or a web site 12. Those service requests and service transactions not handled by self-service routes 10 and 12 lead to phone calls 14 to live agents who handle the phone calls. In particular, as shown in the example of FIG. 4, the phone calls 14 are handled in a parallel process as represented by numerals 31, 32 and 33. These phone calls 14 are handled concurrently by resources 31, 32 and 33 by either referring callers back to the IVR (route 18) or referring callers back to the web site (route 20). Further, the live agents 31, 32 and 33 who handle the phone calls can escalate the calls to a different resource indicated by numeral 34, in which case the call would proceed in series to 35, then to 36, then to 37 and, if necessary, to 38, that is, until the request or transaction is completed. Similarly, the resources 31, 32 and 33 who handle the phone calls can escalate the calls to yet another different resource indicated by numeral 39, in which case the call would proceed in series to 40, then to 41 and, if necessary to 42. As shown in the example of FIG. 4, the queue 16 is of importance given that the capacity constraint is located at the parallel process, represented by numerals 31, 32 and 33. Further, FIG. 4 shows additional capacity constraints at 36 and at 39, with a queue or buffer of importance at 22 (preceding the capacity constraint 36) and a buffer or queue of importance at 24 (preceding the capacity constraint 39). Accordingly, depending on the route a specific service request or service transaction takes through a business process, the service request or service transaction may or may not encounter a capacity constraint. Indeed, one of the objectives of managing capacity in a business process is to allow many of the service inputs to avoid as many capacity constraints as possible given that capacity constraints limit throughput and tend to raise the cost of providing the service. Moreover, if a capacity constraint is a low cost resource, the service provider may increase capacity of the capacity constraint until a higher-cost resource becomes the constraint.

Figure 5:
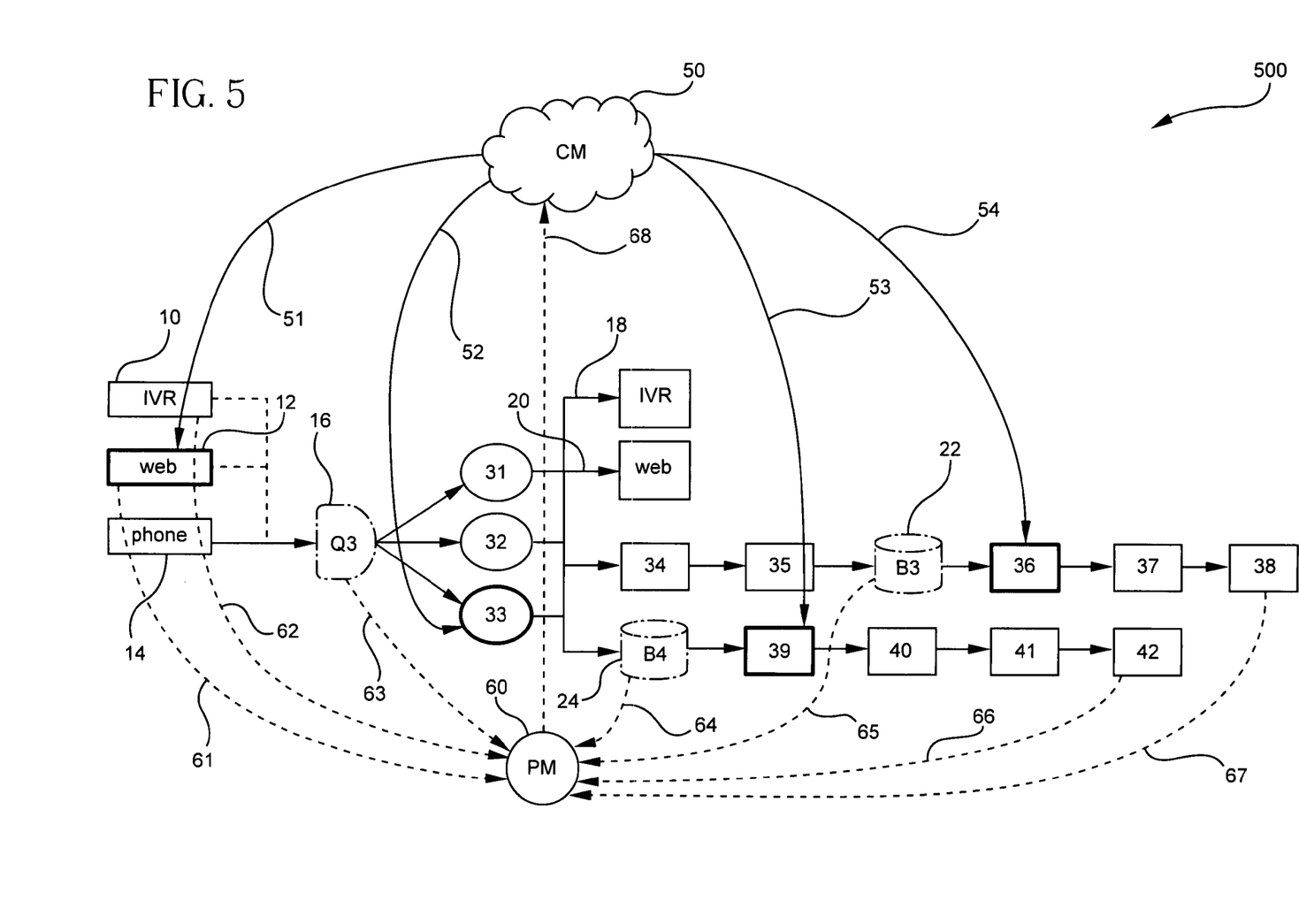
FIG. 5 illustrates a diagram for a method of managing capacity with a capacity management subsystem in a business process having multiple constraints, in accordance with an embodiment of the present invention.

Reference is now made to FIG. 5, which illustrates a method of managing capacity in a hybrid business process 500 that incorporates a capacity management subsystem 50 and a performance monitoring subsystem 60, in accordance with an embodiment of the invention. As shown in FIG. 5, a complex hybrid business process 500 can involve tasks that are arranged in both a serial and parallel fashion. In FIG. 5, service requests and service transactions (not explicitly shown in FIG. 5) can be handled entirely via self-service, such as, an Integrated Voice Response (IVR) unit 10 or a web site 12. Those service requests and service transactions not handled by self-service routes 10 and 12 lead to phone calls 14 to live agents represented by numerals 31, 32 and 33, who handle the phone calls 14. As shown in FIG. 5, there is a parallel arrangement of handling phone calls as represented by numerals 31, 32 and 33. Each of the resources 31, 32 and 33 can handle the phone calls in various ways. For instance, resources 31, 32 and 33 can refer callers back to either the IVR unit (route 18) or back to the web site (route 20). Further, the resources 31, 32 and 33 can choose to escalate the calls to another resource as indicated by 34, in which case the call then could proceed in series to resources 35, 36, 37 and 38 until the service request has been completed. Similarly, the resources 31, 32 and 33 can choose to escalate the calls to resource 39, which can proceed then in series to resources 40, 41 and 42. As shown in the example of FIG. 5, there can be multiple and simultaneous capacity constraints in the business process 500. In this example, since the capacity constraints are shown at 33, 36 and 39, accordingly, the focus of the performance monitoring subsystem 60 and, in turn, the capacity management subsystem 50 in the business process is on the level of the queue 16 (given the capacity constraint is located at 33), the level of the queue or buffer 22 (given the capacity constraint is located at 36) and the level of the queue or buffer 24 (given the capacity constraint is located at 39). Preferably, the performance monitoring subsystem 60 continuously monitors or updates the queue or buffer data at 16, 22 and 24 as well as continuously monitors or updates the service input data and the service output data at predetermined regular intervals in order to instruct the capacity management subsystem 50 to adjust the capacity level of the constraints 33, 36 and 39, as needed. As previously mentioned, depending on the current situation in the business process 500, the capacity constraints can float to other tasks/resources or locations. For instance, the capacity constraint can shift from 33 to 32 or simultaneous capacity constraints could develop at 31, 32 and 33. Thus, the performance monitoring subsystem 60 continuously monitors queue or buffer data, capacity constraint data, non-constraint data that includes any capacity constrained resources, service input data and service output data, so that the capacity management subsystem 50 can make appropriate adjustments in the capacity level of existing capacity constraints at any given moment.

In a preferred embodiment, the service requests include in-person contact by service requesters, phone calls, faxes and text messages, and the service transactions include paper documents and digital records. Also, in a preferred embodiment, the step of directing the capacity management subsystem to adjust the capacity level of the capacity constraints includes one or more of the following actions: activating alternate web sites, adding shifts, adding shifts, removing shifts, adding personnel, removing personnel, resuming normal operations, reducing work schedules, increasing work schedules, reassigning resources between business processes for services utilizing the same process, reassigning resources among clients using the same process, accelerating non-critical task, deferring non-critical task, bumping critical service inputs to the front, substituting automated processing for non-automated processing, hiring subcontractors, releasing subcontractors, obtaining resources, and shedding resources.

Furthermore, in yet another embodiment, the invention provides a system that comprises a computer terminal or an equivalent device, a computer readable storage media or more preferably, a programmable media containing programmable software in a form that is executable by a computer system to manage capacity in an on demand business process having one or more service inputs, at least one service output, at least one capacity constraint having a capacity level and a queue having an upper queue threshold and a lower queue threshold located ahead of the capacity constraint. The programmable software comprises the steps of gathering or collecting with a performance monitoring subsystem a set of data regarding the business process and storing the set of business process data that is collected or gathered on some type of storage medium, for instance, on a computer disc or server. The programmable software further comprises the steps of evaluating, with the performance monitoring subsystem, the set of data collected and transmitting in a timely manner the set of data collected and evaluated by the performance monitoring subsystem to a capacity management subsystem. Further, the programmable software comprises the step of adjusting the capacity level of the capacity constraint either upward or downward in response to the set of evaluated data transmitted by the performance monitoring subsystem to the capacity management subsystem. In a preferred embodiment, the set of data from the business process includes service input data for the one or more service inputs, service output data for a plurality of service factors associated with the service output, capacity constraint data for the capacity constraint, non-constraint data for any non-constraints, and queue data for the queue ahead of the capacity constraint. Preferably, the performance monitoring subsystem is directly linked to each of the service inputs, each of the service outputs, each of the capacity constraints, each of the non-constraints and the queue ahead of each of the capacity constraints and to the capacity management subsystem, such that the performance monitoring subsystem can continuously gather data regarding the business process at predetermined time intervals. In a preferred embodiment, the capacity management subsystem and the capacity management subsystem each include an Information Technology (IT) component. Preferably, the Information Technology component of both the capacity management subsystem and the performance monitoring subsystem comprises a computer system having software installed thereon that is specific to managing a particular business process, preferably, a business process that is operated on demand. For instance, customized software applications or programs can be developed for a particular business process to perform any or all of the functions carried out by the performance monitoring subsystem (such as, monitoring, evaluating, transmitting, etc.) and to perform any of the functions carried out by the capacity management subsystem (such as, any step taken to adjust the capacity level of one or more capacity constraints). Similarly, the set of data gathered by the performance monitoring subsystem can be stored on some storage medium, preferably, on a server. Moreover, as mentioned previously, both the performance monitoring subsystem and the capacity management subsystem each include a human resource component, that is, have people that are decision makers. The human component may oversee any capacity adjustment recommendations made by the performance monitoring subsystem to the capacity management subsystem and can manually override any such capacity adjustment recommendation, preferably, by using a computer program that provides various screen displays to help enable the human component to override any capacity adjustment recommendation. Further, a human component can input an override decision with respect to adjusting capacity by using an input device, such as a keyboard.

In yet another embodiment, the invention provides a method of providing a service on demand to a service requester. The method comprises providing a business process having one or more service inputs, one or more service outputs, one or more capacity constraints, each of the capacity constraints having a capacity level, and a queue with an upper queue threshold and a lower queue threshold located ahead of each of the capacity constraints. The method further comprises measuring a set of business process data with a performance monitoring subsystem. Preferably, the set of business process data includes non-constraint data pertaining to any non-constraints in the business process. Further, the method includes evaluating the set of business process data with the performance monitoring subsystem, transmitting in a timely manner the set of business process data that has been evaluated by the performance monitoring subsystem to a capacity management subsystem and directing the capacity management subsystem to adjust either upward or downward the capacity level of the capacity constraints in response to the set of business process data transmitted by the performance monitoring subsystem. In a preferred embodiment, the directing step further comprises the capacity management subsystem issuing a directive to increase or decrease the capacity level of one or more of the capacity constraints in response to the set of business process data transmitted by the performance monitoring subsystem in order to manage capacity in the business process. The inventive method recognizes that any existing capacity constraints as well as existing non-constraints, especially, capacity constrained resources are the key to providing services on demand, especially when the demand can fluctuate, available resources are scarce, and the expected service levels are to be kept at a consistent level.

The foregoing descriptions of specific embodiments of the present invention have been presented for the purpose of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the claims appended hereto and their equivalents.

What is claimed is:

1. A computer implemented method of achieving a desired service level for one or more of a plurality of service factors for providing a service to a service requester, said computer implemented method comprising:

providing a business process having one or more service inputs, one or more service outputs, one or more capacity constraints each having a capacity level, and a buffer with an upper buffer threshold and a lower buffer threshold for a buffer level, wherein said buffer queues up transactions that pile up ahead of said capacity constraints, wherein said capacity constraints are resources used to provide the service to the service requester, and wherein said upper buffer threshold and said lower buffer threshold are respectively upper and lower capacity limits of the buffer;

a processor in a computer system measuring with a performance monitoring subsystem a set of business process data including service input data for said one or more service inputs, service output data for said one or more service outputs, capacity constraint data for said one or more capacity constraints, non-constraint data for each non-constraint, and queue data for said buffer; wherein said performance monitoring subsystem comprises said computer system having software installed thereon to manage a particular business process, and wherein said queue data comprises a number of times per a predetermined period that said buffer level goes beyond the upper buffer threshold, a number of times per said predetermined period that said buffer level goes beyond the lower buffer threshold, and a length of time that said buffer level exceeds the upper buffer threshold and said lower buffer threshold;

transmitting said set of business process data measured by said performance monitoring subsystem to a capacity management subsystem, wherein said capacity management subsystem utilizes said computer system used by said performance monitoring subsystem; and directing said capacity management subsystem to adjust said capacity level of said one or more capacity constraints in response to said set of business process data transmitted by said performance monitoring subsystem in order to achieve said desired service level for said one or more of said plurality of service factors that are associated with said one or more service outputs.

2. The computer implemented method according to claim 1, wherein said measuring with a performance monitoring subsystem further comprises:

measuring an existing service level for each of said set of business process data, including an existing service level for said plurality of service factors associated with said one or more service outputs.

3. The computer implemented method according to claim 1, wherein said directing said capacity management subsystem further comprises:

evaluating with said performance monitoring subsystem said set of business process data measured by said performance monitoring subsystem before transmitting said set of business process data to said capacity management subsystem; and instructing said capacity management subsystem to adjust either upward or downward said capacity level of said one or more capacity constraints in order to achieve said desired service level for said one or more of said plurality of service factors.

4. The computer implemented method according to claim 1, wherein said directing said capacity management subsystem to adjust said capacity level of said one or more capacity constraints further comprises one or more of activating alternate web sites, adding shifts, removing shifts, adding personnel, removing personnel, resuming normal operations, reducing work schedules, increasing work schedules, reassigning resources between business processes for services utilizing the same process, reassigning resources among clients using the same process, accelerating non-critical tasks, deferring non-critical tasks, bumping critical service inputs to the front, substituting automated processing for non-automated processing, hiring subcontractors, releasing subcontractors, obtaining resources, and shedding resources.

5. The computer implemented method according to claim 1, wherein said one or more service inputs comprises one of: service requests and service transactions.

6. The computer implemented method according to claim 1, wherein said plurality of service factors associated with said one or more service outputs comprises: speed, cost, quality and scope.

7. The computer implemented method according to claim 5, wherein said service requests comprises at least one of: in-person contact by service requesters, phone calls, faxes and text messages, and wherein said service transactions comprises at least one of: paper documents and digital records.

8. The computer implemented method of claim 1, wherein the service utilizes a low cost resource and a higher cost resource operating in series, wherein the higher cost resource is more expensive to utilize than the low cost resource, and wherein the low cost resource is a capacity constraint and the higher cost resource is not a capacity constraint to the service, the computer implemented method further comprising:
increasing a capacity of the low cost resource until the higher cost resource becomes the capacity constraint to the service.

9. The computer implemented method of claim 1, wherein one of the service inputs is a phone call, wherein one of the capacity constraints is for a live agent who handles phone calls, and wherein the computer implemented method further comprises:
the live agent transferring the phone call to an interactive voice response (IVR) system.

10. A computer program product for achieving a desired service level for one or more of a plurality of service factors for providing a service to a service requester, said computer program product comprising:
a computer readable storage media;
first program instructions to provide a business process having one or more service inputs, one or more service outputs, one or more capacity constraints each having a capacity level, and a buffer with an upper buffer threshold and a lower buffer threshold for a buffer level, wherein the buffer queues up transactions that pile up ahead of the capacity constraints, wherein said capacity constraints are resources used to provide the service to the service requester, and wherein said upper buffer threshold and said lower buffer threshold are respectively upper and lower capacity limits of the buffer;
second program instructions to measure a set of business process data including service input data for said one or more service inputs, service output data for said one or more service outputs, capacity constraint data for said one or more capacity constraints, non-constraint data for each non-constraint, and queue data for said buffer, wherein said queue data comprises a number of times per a predetermined period that the buffer level goes beyond the upper buffer threshold, a number of times per the predetermined period that the buffer level goes beyond the lower buffer threshold, and a length of time that the buffer level exceeds the upper buffer threshold and the lower buffer threshold;
third program instructions to transmit said set of business process data measured by said performance monitoring subsystem to a capacity management subsystem; and
fourth program instructions to direct said capacity management subsystem to adjust said capacity level of said one or more capacity constraints in response to said set of business process data transmitted by said performance monitoring subsystem in order to achieve said desired service level for said one or more of said plurality of service factors that are associated with said one or more service outputs; and wherein
said first, second, third, and fourth program instructions are tangibly encoded on said computer readable storage media.

11. The computer program product of claim 10, further comprising:
fifth program instructions to measure an existing service level for each of said set of business process data, including an existing service level for said plurality of service factors associated with said one or more service outputs; and wherein
said fifth program instructions are tangibly encoded on said computer readable storage media.

12. The computer program product of claim 10, further comprising:
fifth program instructions to evaluate said set of business process data measured by said performance monitoring subsystem before transmitting said set of business process data to said capacity management subsystem; and
sixth program instructions to adjust either upward or downward said capacity level of said one or more capacity constraints in order to achieve said desired service level for said one or more of said plurality of service factors; and wherein
said fifth and sixth program instructions are tangibly encoded on said computer readable storage media.

13. The computer program product of claim 10, further comprising:
fifth program instructions to alternate web sites, add shifts, add personnel, increase work schedules, reassign resources between business processes for services utilizing a same process, reassign resources among clients that use a same process, defer non-critical tasks, and substitute automated processing for non-automated processing; and wherein
said fifth program instructions are tangibly encoded on said computer readable storage media.

14. A computer system comprising:
a processor, a computer readable memory, and a computer readable storage media;
first program instructions to provide a business process having one or more service inputs, one or more service outputs, one or more capacity constraints each having a capacity level, and a buffer with an upper buffer threshold and a lower buffer threshold for a buffer level, wherein the buffer queues up transactions that pile up ahead of the capacity constraints, wherein said capacity constraints are resources used to provide the service to the service requester, and wherein said upper buffer threshold and said lower buffer threshold are respectively upper and lower capacity limits of the buffer;
second program instructions to measure a set of business process data including service input data for said one or more service inputs, service output data for said one or more service outputs, capacity constraint data for said one or more capacity constraints, non-constraint data for each non-constraint, and queue data for said buffer, wherein said queue data comprises a number of times per a predetermined period that the buffer level goes beyond the upper buffer threshold, a number of times per the predetermined period that the buffer level goes beyond the lower buffer threshold, and a length of time that the buffer level exceeds the upper buffer threshold and the lower buffer threshold;

third program instructions to transmit said set of business process data measured by said performance monitoring subsystem to a capacity management subsystem; and fourth program instructions to direct said capacity management subsystem to adjust said capacity level of said one or more capacity constraints in response to said set of business process data transmitted by said performance monitoring subsystem in order to achieve said desired service level for said one or more of said plurality of service factors that are associated with said one or more service outputs; and wherein said first, second, third, and fourth program instructions are tangibly encoded on said computer readable storage media for execution by said processor via said computer readable memory.

15. The computer system of claim 14, further comprising:

fifth program instructions to measure an existing service level for each of said set of business process data, including an existing service level for said plurality of service factors associated with said one or more service outputs; and wherein said fifth program instructions are tangibly encoded on said computer readable storage media for execution by said processor via said computer readable memory.

16. The computer system of claim 14, further comprising:

fifth program instructions to evaluate said set of business process data measured by said performance monitoring subsystem before transmitting said set of business process data to said capacity management subsystem; and sixth program instructions to adjust either upward or downward said capacity level of said one or more capacity constraints in order to achieve said desired service level for said one or more of said plurality of service factors; and wherein said fifth and sixth program instructions are tangibly encoded on said computer readable storage media for execution by said processor via said computer readable memory.

17. The computer system of claim 14, further comprising:

fifth program instructions to alternate web sites, add shifts, add personnel, increase work schedules, reassign resources between business processes for services utilizing the same process, reassign resources among clients that use a same process, accelerate non-critical tasks, defer non-critical tasks, and substitute automated processing for non-automated processing, wherein said fifth program instructions are tangibly encoded on said computer readable storage media for execution by said processor via said computer readable memory.

* * * * *